Figures 1, 4, 5:
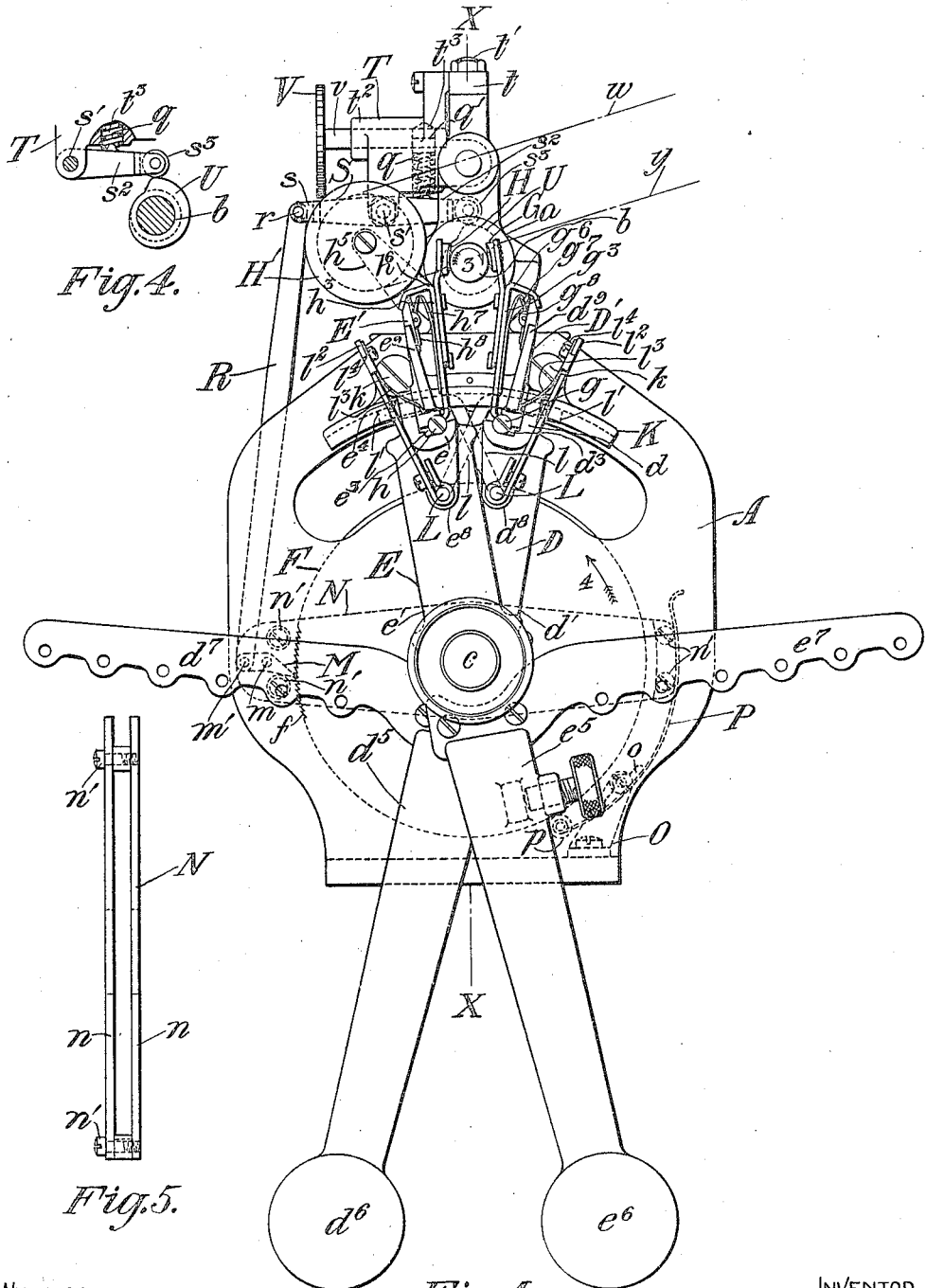

M. HELM.
WINDING MACHINE.
APPLICATION FILED FEB. 13, 1913.

1,134,268.

Patented Apr. 6, 1915.
2 SHEETS—SHEET 1.

WITNESSES

INVENTOR
Max Helm
By
Foster Freeman Watson Hart
ATTORNEYS

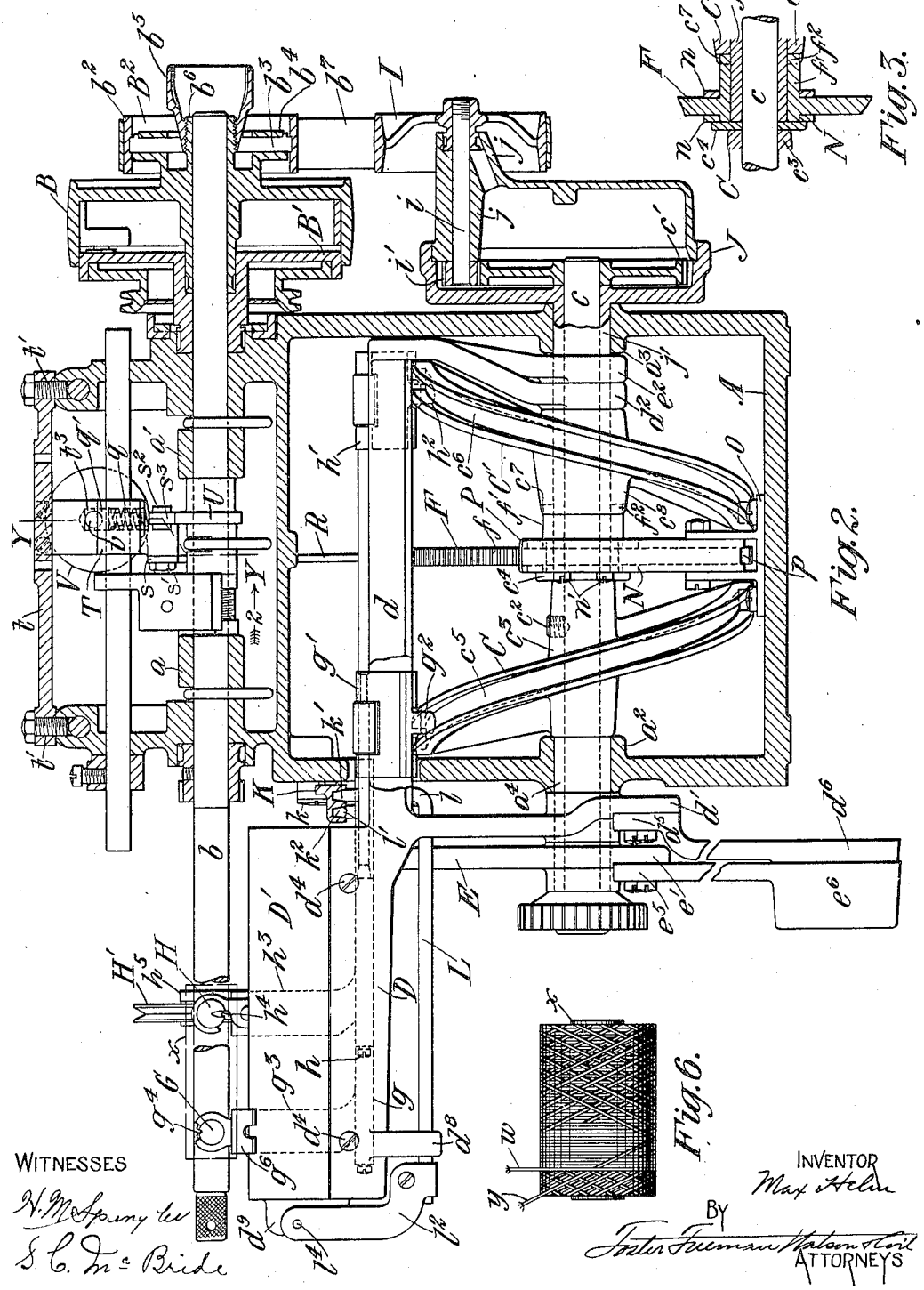

UNITED STATES PATENT OFFICE.

MAX HELM, OF PANKOW, NEAR BERLIN, GERMANY, ASSIGNOR TO JOSEPH ROBERT LEESON, OF BOSTON, MASSACHUSETTS.

WINDING-MACHINE.

1,134,268.  Specification of Letters Patent.  Patented Apr. 6, 1915.

Original application filed January 4, 1913, Serial No. 740,266. Divided and this application filed February 13, 1913. Serial No. 748,221.

*To all whom it may concern:*

Be it known that I, MAX HELM, a subject of the Emperor of Germany, residing at Pankow, near Berlin, Germany, have invented certain new and useful Improvements in Winding-Machines, of which the following is a specification.

My invention relates to winding machines for winding coils for electrical purposes, such as magnet and resistance coils.

It consists essentially of an improved machine for simultaneously winding wire and insulating material on the coil in alternate layers, with the wire laid in a close wind in the well known manner of spool winding, while the insulating strands or threads are laid with a diagonal or cross-wind, such as by the method now generally known as the "universal" or "V-wind."

My new machine is particularly intended for winding the improved electrical coil shown and described in my pending application Serial No. 740,266, filed Jan. 4, 1913, from which the present application is divided.

It embodies the novel feature of an arrangement of two or more winding-guides adapted to be simultaneously reciprocated in respect to the winding-spindle or mandrel on which the coil is wound; the guide for the insulating material being operated with a quick traverse while the guide for the wire is given a relatively slow traverse. In this way the windings of wire are laid side by side in close juxtaposition while the strands of insulating material are wound diagonally or cross-wise thereof and woven in and out among the windings of wire. The insulating strands, which may be of cotton yarn or other textile fiber, flat tape or any suitable attenuated material, form a mechanical binder for the wire windings, effectually linking them together and retaining them in their proper position, while also aiding in insulating the wire windings, one from another, and providing insulation between the layers. In this way my new machine produces a self-sustaining coil without the use of end flanges, spool heads, or other retaining means, and one having increased electrical efficiency due to the precise and accurate disposition of the windings, their protection against displacement, and the improved insulation therein.

The invention is fully described in the following specification, illustrated by the accompanying drawings, in which:—

Figure 1 is an end view of my improved winding machine, showing a double guide arrangement; Fig. 2, a side view of the same with the main portion of the machine shown in section on the line X—X of Fig. 1; Fig. 3, a longitudinal sectional view of the ratchet-wheel which is mounted on the cam-shaft to drive the cam for the wire-guide; Fig. 4, a transverse sectional view taken through the winding-spindle on the line Y—Y of Fig. 2, looking in the direction indicated by the arrow 2, and showing the cam which operates the pawl for the cam-driving ratchet-wheel; Fig. 5, a plan view of the rockable arm which carries said pawl; Fig. 6, a side view of the improved coil produced by the machine, the outer layer of the wire windings being shown as not quite completed.

Referring to Figs. 1 and 2, A is the main frame of the machine constructed with bearings $a$, $a'$ for the winding-spindle $b$ which is adapted to be rotated from any suitable source of power through the medium of the usual driving-pulley B. The pulley B is preferably connected to the spindle through a clutch device such, for instance, as that represented by B′ or by any other suitable arrangement. Mounted in bearings $a^2$, $a^3$ in the frame A is a cam-shaft $c$ arranged below and parallel with the spindle $b$ and adapted to be driven therefrom. The cam-shaft $c$ carries the cams C and C′ which are connected to reciprocate the thread-guide G and wire-guide H, respectively, as hereinafter more particularly described. The spindle $b$ may be connected to the cam-shaft $c$ to drive the latter through any suitable means such as pulleys and belts or a train of gearing; but I have preferred to here illustrate a mechanism well known in the winding art and constructed as follows: The hub of the driving-pulley B is formed as a part of an auxiliary pulley B² which is preferably of the expansible type. The pulley B² has a split rim $b^2$ and plunger spokes $b^3$ arranged to slide radially in their bearings $b^4$ to expand or contract the rim $b^2$ and thereby alter the diameter of the pulley. The inner ends of the spokes $b^3$ are beveled off and engage the tapered periphery of a hand-nut $b^5$. The hand-nut $b^5$ is screwed onto the end of the hub $b^6$ and when turned manually in one direction acts to slide the spokes outward to expand the pulley and increase its diameter. When turned in the opposite direction the spring tendency of the rim $b^2$ acts to retract the spokes in their bearings and the diameter of the pulley is therefore reduced.

The expansible pulley $B^2$ is connected by a belt $b^7$ to drive a pulley I which is mounted fast on the outer end of the shaft $i$. The shaft $i$ rotates in a bearing $j$ of a casing or frame J which is formed with a projecting sleeve $j'$ extending through the bearing $a^3$ of the frame A and surrounding the cam-shaft $c$. Mounted fast on the end of the cam-shaft $c$ is a gear $c'$ which meshes with a pinion $i'$ secured to the inner end of the shaft $i$. It will thus be seen that rotation imparted to the spindle $b$ will be transmitted from the pulley $B^2$ through the belt $b^7$ to the pulley I, and thence through the shaft $i$, pinion $i'$ and gear $c'$ to the cam-shaft $c$. By adjusting the hand-nut $b^5$ of the pulley $B^2$ the diameter of the latter can be increased or decreased, as before described, and in this way the speed ratio between the spindle and cam-shaft may be altered within certain limits. This adjustment of the relative speeds of the spindle and cam-shaft is provided for regulating the spacing of the coils of winding on the spindle in the manner well known and generally used for winding textiles.

The sleeve $j'$ of the frame J extends through the bearing $a^3$ for a distance of about half the width of the frame A and the cam $C'$ is mounted to rotate thereon independently of the cam-shaft $c$. The cam C, however, is mounted directly on the shaft $c$ and is secured rotatively therewith by suitable means such as the set-screw $c^2$ extending through its hub $c^3$. Mounted in the bearing $a^2$ is a sleeve or bushing $a^4$ which projects from the outer side of the frame A. One end of the hub $c^3$ of the cam C abuts the inner end of the bushing $a^4$ and its opposite end abuts a washer $c^4$ which bears against the end of the sleeve $j'$, see Fig. 3.

The winding-spindle $b$ projects outwardly from the bearing $a$ of the frame A and is adapted to receive a tube or shell $x$ on which the coil is built up. The guide G for the insulating material, called for convenience the thread-guide, and the wire-guide H are arranged on opposite sides of this overhanging portion of the spindle $b$ and are adapted to bear directly thereon or on the tube $x$ on which the windings are deposited. Both guides are adapted to separate or recede from the axis of the winding-spindle as the winding increases in diameter and for this purpose they may be supported on swinging traverse-frames D and E which as here shown are pivoted on the axis of the cam-shaft $c$.

The traverse-frames D and E are of substantially the same form, being constructed with horizontally arranged portions $d$ and $e$ and depending arms $d'$, $d^2$ and $e'$, $e^2$. Their outer arms $d'$ and $e'$ are formed with hubs mounted on the projecting portion of the bushing $a^4$ while the inner arms $d^2$, $e^2$ are pivotally supported on the sleeve $j'$. The main portions $d$ and $e$ of both frames are formed with longitudinal grooves $d^3$, $e^3$, see Fig. 1, in which are slidably mounted the traverse rods $g$ and $h$. The rod $g$ is secured at its inner end to a runner $g'$ from the lower side of which projects a stud or roll $g^2$ adapted to engage with the groove $c^5$ of the cam C. The rod $h$ is similarly connected to a runner $h'$ having a roll $h^2$ engaging the groove $c^6$ of the cam $C'$. Extending upwardly from the outer ends of the rods $g$ and $h$ are the guide-carrying arms or holders $g^3$ and $h^3$ in which are mounted the guides G and H. The thread-guide G is formed with a guiding-notch $g^4$ on its upper side while the wire-guide H has a corresponding notch $h^4$ on its under side, these notches being adapted to receive the material to direct it onto the winding-spindle. Extending from the guide-holder $h^3$ is an arm $h^5$ on which is mounted a guide-wheel or pulley $H'$. The wire $w$ leads around the pulley $H'$ before passing through the notch $h^4$ in the guide H, but the yarn $y$, or other insulating material, leads directly to the guide-notch $g^4$ in the guide G. The traverse-frames D and E are constructed with guiding-plates or backs $D'$, $E'$, attached thereto by means of the screws $d^4$, $e^4$ and having their lower edges overlapping the traverse-rods $g$ and $h$ to retain the latter in the grooves $d^3$ and $e^3$. The guide-holders $g^3$ and $h^3$ extend upward substantially parallel with the plates $D'$ and $E'$ and their upper extremities are bent over at $g^6$ and $h^6$ to overlap the upper edges of the plates. Secured to the guide-holders are flat hairpin-shaped springs $g^7$, $h^7$ which are folded over at the top to form cushioning elements between the guide-holders and the guiding-plates $D'$ and $E'$. The outer ends of the springs $g^7$, $h^7$ are preferably pivotally attached to flat slides or plates $g^8$, $h^8$ adapted to slide along the faces of the plates $D'$ and $E'$.

To the outer arms $d'$ and $e'$ of the frames D and E are attached depending arms $d^5$, $e^5$ carrying weights $d^6$, $e^6$ at their lower ends. The arms $d^5$, $e^5$ are also formed with right-angled branches $d^7$, $e^7$ on which additional weights may be suspended. These arms act to counterweight the upper portions of the frames D and E and serve to maintain the guides G and H constantly bearing on the surface of the winding. The springs $g^7$, $h^7$ are provided to allow the guides to yield slightly independently of their traverse-frames, so that they can pass freely over irregularities on the surface of the winding without causing a vibrating movement of the frames.

It has been found advantageous in some cases to apply dogging-mechanism to the traverse-frames for preventing the movement of the guides toward the winding-spindle after they have once been forced outward by the growth of the winding. For this purpose there is illustrated in the drawings a means similar to that employed on winding machines used extensively and now well known in the textile art, and arranged as follows: Secured to the frame A by the screws $k$, $k$ is an arcuate sector K disposed concentric with the axis on which the traverse-frames D and E swing, see Fig. 1. Referring to Fig. 2, the sector K is formed with two parallel, tapered grooves, $k'$, $k^2$ also arranged concentric with the axis of the traverse-frames. On the frames D and E are rods L, L extending through holes in the arms $d'$, $e'$ and also through lugs $d^3$, $e^3$ at the outer ends of the frames. The inner ends of these rods are bent upward in the arms $l$, $l$ which are formed with curved portions $l'$, $l'$ fitted to the grooves $k'$, $k^2$ in the sector K. To the outer ends of the rods are secured flat finger-levers $l^2$, $l^2$ extending upward adjacent the backs of plates D' and E'. Flat springs $l^3$, $l^3$ are secured at $l^4$, $l^4$ to the levers $l^2$, $l^2$ with their lower ends bearing against abutments $d^9$, $e^9$ on the plates D' and E' and serve to normally hold the levers away from said plates to force the wedge portions $l'$, $l'$ of the arms $l$, $l$ into snug engagement with the grooves $k'$, $k^2$ of the sector K. This wedging engagement prevents the frames D and E from swinging toward the winding-spindle until the arms $l$, $l$ are released by rocking them through manipulation of the finger-levers $l^2$, $l^2$. At the same time the movement of the frames D and E outward from the winding-spindle is not restricted by the arms $l$, $l$ because such movement tends to release their wedge portions from the sector K.

As before stated, the cam C for the thread-guide G is fast on the shaft $c$ and is driven positively therefrom through the means above described. The cam C' is free to rotate on the sleeve $j'$ and is driven independently through a separate connection with the winding-spindle as now explained: Referring to Figs. 2 and 3, F designates a ratchet-wheel having peripheral teeth $f$ and formed with a hub $f'$ mounted on the sleeve $j'$. The end of the hub $f'$ is provided with splines $f^2$ engaging corresponding slots $c^7$ in the end of the hub $c^8$ of the cam C', or the ratchet-wheel F might be otherwise secured rotatively therewith. A rocker-arm N, see Fig. 3, consisting of two halves, $n$, $n$ fastened together at their ends by the screws $n'$, $n'$, as shown more plainly in Fig. 5, is mounted on the hub of the wheel F with the halves $n$, $n$ straddling the latter. Secured to the base of the frame A is a standard or bracket O in which is pivoted a rockable member $o$ carrying an arcuate spring-plate P arranged substantially concentric with the axis of the cam-shaft $c$. The upper end of the plate P bears against the rounded end of the rocker-arm N to apply friction thereto and prevent a too free movement of the arm. Pivoted on the lower end of the plate is a roll $p$ which bears against the teeth of the ratchet-wheel F to restrain the latter from unwarranted movement.

Pivoted at $m$ on the opposite end of the rocker-arm N is a pawl M formed with its inner end adapted to engage the teeth $f$ of the ratchet-wheel F, see Fig. 1. The outer end of the pawl M is connected by a pin $m'$ to a rod or link R the upper end of which is connected by a pin $r$ to one arm $s$ of a rockable lever S. The arm $s$ is fast on the end of a stud $s'$ extending through a bearing in the bracket T, the latter having an arm $t$ secured by the bolts $t'$, $t'$ to the top of the frame A, see Figs. 1 and 2. Fast on the opposite end of the stud $s'$ is a second arm $s^2$ which carries a roll $s^3$. The roll $s^3$ is adapted to bear on the periphery of a cam U secured on the winding-spindle $b$ to be rotated therewith, see Fig. 4.

A disk V, preferably formed with a knurled periphery, is secured to the end of a stud $v$ which is rotatably mounted in a bearing $t^2$ in the bracket T. A coiled spring $q$ arranged in a pocket $t^3$ of the bracket T bears at its upper end against a shoe $q'$ which presses against the stud $v$ to provide resistance to the turning of the disk V. The lower end of the spring $q$ bears on the top of the arm $s^2$ of the lever S and serves to maintain the roll $s^3$ in contact with the cam U, see Fig. 4. The disk V is positioned above the outer end of the arm $s$ with its edge adapted to contact therewith, and is arranged on the stud $v$ eccentric to the axis of the latter. It will thus be seen that by turning the disk the relation of its lower edge to the top of the lever S can be altered, and in this way the movement of the lever under action of the spring $q$ is adjusted to vary the extent of motion imparted to it by the cam U.

The method of operation of the improved machine is as follows: The yarn $y$ or other insulating material is led from its source of supply through the notch $g^4$ in the thread-guide G and its end secured to the winding-spindle $b$ or to the tube $x$ on which the coil is to be wound. The wire $w$ is led around the guide-wheel H', thence through the notch $h^4$ in the guide H and also secured to the winding-spindle, a free end being left for making electrical connections after the coil is completed. The guides G and H are now placed in contact with the surface of the spindle $b$ or tube $x$ by releasing the dog arms $l$, $l$ from engagement with the sector K, through manipulation of the finger-levers $l^2$, $l^2$, and the machine is then ready to start. The starting of the machine is effected through the action of clutch-controlling mechanism, not here shown or described, and rotation imparted to the spindle $b$ through the pulley B. As the spindle $b$ rotates in the direction indicated by the arrow 3, Fig. 1, to wind on the wire $w$ and yarn $y$, the cam U rotating therewith imparts a rocking motion to the lever S which is transmitted through the link R to the arm N. Each time the link R is moved downward the pawl M is carried into engagement with one of the teeth $f$ on the ratchet-wheel F and a slight rotative impulse imparted to the wheel and its connected cam C'. Each time the high point on the cam U passes from under the roll $s^3$ the outer arm $s$ of the lever S is rocked upward, under the influence of the spring $q$, and the pawl M is slid back over the teeth $f$. During this time the ratchet-wheel F is held from backward rotation by the friction roll $p$ carried by the spring-plate P, as before explained. The cam C' is thus slowly turned in the direction indicated by the arrow 4, Fig. 1, and the wire-guide H is traversed thereby from one end of the tube $x$ to the other. By adjusting the disk V the extent of movement of the lever S can be varied to regulate the range of action of the pawl M. This controls the speed of the cam C' and thereby the ratio of speed between the winding-spindle $b$ and guide H can be regulated to provide for laying the wire $w$ in closely adjacent windings as illustrated in Fig. 6. It will be understood that the range of adjustment of this part of the mechanism is such that the finest or coarsest wire can be wound with the desired close spacing of the windings. Meanwhile, during the laying of the wire windings, the thread-guide G is being reciprocated rapidly back and forth by the cam C at a much faster rate of speed than that of the cam C'. This lays the yarn $y$ or other binding and insulating material in cross-windings which intermingle with the wire windings to hold the latter in place and, at the same time, build up the insulating and cushioning layers between the layers of wire as illustrated in Fig. 6. The speed of the cam C is regulated by adjusting the expansible pulley $B^2$ and in this way the spacing of the yarn windings can be regulated as best suited to the size of wire and insulating material being wound. In some cases I have found it of advantage to employ a cam C for the yarn or thread-guide G which will give a slightly longer traverse to the latter than that imparted to the wire-guide H by the cam C'. This provides that the layers of insulating material will extend beyond the wire layers a slight distance at each end so as to form a more substantial foundation for the end windings of wire. This overlapping of the yarn layers also results in building up a thin, washer-like structure of insulating material at both ends of the coil which can be coated with shellac or other compound to provide protecting covering for the wire windings.

The improved coil produced by my new machine has various mechanical and electrical advantages as fully pointed out in my previous application for patent before referred to. Modifications might be made in the system of winding the coils on the improved machine herein described and changes could also be made in the arrangement of the winding-mechanism without departing from the spirit or scope of the present invention. In place of one guide for the insulating material, several might be employed so arranged as to be operated simultaneously at different points around the axis of the winding-spindle. Other means might be employed for supporting the guides and for reciprocating them, and modifications could also be made in the cam-driving mechanism, all within the scope of this invention.

Without limiting myself to the exact embodiment herein shown and described, what I claim is:—

1. In a winding machine for winding coils for electrical purposes, the combination with a winding-spindle, of a plurality of guides operated simultaneously but independently of each other to direct the material onto the spindle, and means to cause a relative reciprocation between the spindle and the guides.

2. In a winding machine for winding coils for electrical purposes, the combination with a winding-spindle, of a plurality of guides for directing the material onto the spindle, and means to simultaneously reciprocate the guides independently of each other.

3. In a winding machine, the combination with the winding-spindle, of a plurality of guides for directing the material onto the spindle, and separate means for simultaneously reciprocating the guides with respect to the spindle.

4. In a winding machine, the combination with the winding-spindle, of a plurality of guides adapted to be reciprocated with respect to the spindle, and means to simultaneously reciprocate said guides at different rates of speed.

5. In a winding machine, the combination with the winding-spindle, of a plurality of guides adapted to be independently and simultaneously reciprocated longitudinally of the spindle, separate means to reciprocate each guide, and means to adjust the ratio of speed of traverse of the guides.

6. In an apparatus for winding coils for electrical purposes, the combination with a rotating winding-spindle, of a plurality of guides arranged to recede from the spindle in different directions, and means to simultaneously reciprocate the guides longitudinally in relation to the spindle.

7. In a winding machine, the combination with the winding-spindle, of a plurality of guides arranged to recede from the spindle as the winding is built up thereon, of separate means to reciprocate each guide while allowing their simultaneous operation.

8. In a winding machine, the combination with the winding-spindle, of a plurality of guides adapted to bear on the spindle and to recede therefrom as the winding increases in diameter, of separate cams for simultaneously reciprocating the guides independently of each other, and means to adjust the speed ratio between the cams.

9. In a winding machine, the combination with the winding-spindle, of two independent guides arranged opposite said spindle, means to reciprocate one of the guides along the spindle with a relatively slow rate of traverse, and means to simultaneously reciprocate the other guide with a relatively fast traverse.

10. In a winding machine, the combination with the winding-spindle, of independent guides adapted to be reciprocated simultaneously along the spindle, separate cams for traversing the guides, means connecting one of the cams to be driven from the spindle at a relatively slow rate of speed, and means connecting the other cam to be driven from the spindle at a faster rate of speed.

11. In a winding machine, the combination with the winding-spindle, of independent guides adapted to be reciprocated simultaneously along the spindle, means to reciprocate one of the guides, a ratchet-wheel for operating said means, a pawl actuated from the rotation of the winding-spindle to drive the ratchet-wheel, means for reciprocating the other guide, and separate means connected with the winding-spindle to drive the latter means.

12. In a winding machine, the combination with the winding-spindle, of independent guides adapted to be reciprocated simultaneously along the spindle, means to reciprocate one of the guides, a ratchet-wheel for operating said means, a pawl actuated from the rotation of the winding-spindle to drive the ratchet-wheel, means to adjust the extent of action of the pawl, means for reciprocating the other guide, and separate means connected with the winding-spindle to drive the latter means.

13. In a winding machine, the combination with the winding-spindle, of independent guides adapted to be simultaneously reciprocated longitudinally of the spindle, means to reciprocate one of the guides, a ratchet-wheel for operating said means, a rocker-arm pivoted on the axis of said wheel, a pawl on said arm adapted to engage the teeth of the wheel, a rockable lever, a cam on the winding-spindle arranged to rock said lever, and means connecting said lever to operate the pawl to turn the ratchet-wheel.

14. In a winding machine, the combination with the winding-spindle, of a guide adapted to be reciprocated longitudinally of the spindle, means to reciprocate said guide, a ratchet-wheel to drive said means, a pawl to turn the ratchet-wheel, a rockable lever to operate the pawl, and adjustable means to limit the extent of movement of the lever to control the range of action of the pawl.

15. In a winding machine, the combination with the winding-spindle, of a guide for the material, means to reciprocate the guide longitudinally of the spindle, a ratchet-wheel to drive said means, a pawl to rotate the ratchet-wheel, a rockable lever to operate the pawl, and an adjustable disk arranged eccentric to its axis with its edge adapted to contact with the lever to limit the range of action of the latter.

16. In a winding machine, the combination with the winding-spindle, of a plurality of guides for directing the material onto the spindle, and means to simultaneously reciprocate the guides longitudinally of the spindle with one guide having a longer traverse than the other.

17. In a winding machine, the combination with the winding-spindle, of two guides adapted to be reciprocated with respect to the spindle and two cams for reciprocating the guides simultaneously, one cam having a throw of greater extent than that of the other.

18. In a winding machine for winding electrical coils, the combination with the winding-spindle, of a guide for the wire, means to reciprocate said guide longitudinally of the spindle, a thread-guide for the insulating material, means to reciprocate the thread-guide with a longer traverse than that of the wire-guide and devices connecting the reciprocating means to cause both guides to be operated simultaneously.

19. A machine for producing electrical coils, having a wire-traverse and an insulating-material traverse differentiated in the speed of their travel and operating to alternately apply wire and insulating material one over the other and helically with respect to the axis of the coil.

20. A machine for producing electrical coils having means for automatically winding wire and insulating material alternately one upon the other, and helically with respect to the axis of the coil.

21. A machine for producing electrical coils having a wire traverse and an insulating material traverse operating to alternately apply the wire and insulating material one upon the other and helically with respect to the axis of the coil.

22. A machine for producing electrical coils comprising means for winding conducting material to form layers, and means for simultaneously winding insulating material thereover.

23. A machine for producing electric coils having a wire traverse and an insulating material traverse differentiated in the rate of their travel, and means for relatively varying the rate of their travel.

24. A machine for producing electric coils comprising means for winding conducting material in layers, means for winding insulating material thereon and for winding the insulating material beyond the ends of the layers of conducting material to form end supports.

25. A machine for producing electric coils having a wire traverse and an insulating material traverse differentiated in the speed of their travel, and means for winding the insulating material at the ends of its traverse beyond the end of the wire to form end supports.

26. A machine for producing electric coils having a wire traverse and an insulating material traverse differentiated in the speed of their travel, mechanism for utilizing the insulating material in the production of spirally wound end closures at the ends of the spiral layers of wire, and mechanism for reversing the wire and insulating material traverses.

27. A machine for producing electrical coils having a wire traverse and an insulating material traverse differentiated in the speed of their travel and operating to alternately apply wire and insulating material one upon the other and helically with respect to the axis of the coil, and means for reversing the said traverse.

28. A machine for producing electrical coils comprising means for helically winding conducting material to form layers, and means for winding insulating material over and under the separate turns of conducting material in the layers to hold the conducting material in place and reinforce the structure.

29. A machine for producing electrical coils comprising means for helically winding conducting material with succeeding spiral turns side by side in close juxtaposition, and means for winding insulating material thereon with its turns at an angle to the turns of conducting material whereby its strands will cross the turns of conducting material diagonally.

30. A machine for producing electrical coils comprising means for helically winding conducting material with succeeding spiral turns side by side in close juxtaposition, and means for winding insulating material thereon over and under the separate turns of conducting material in the layers.

In testimony whereof I affix my signature in presence of two witnesses.

MAX HELM.

Witnesses:
 WOLDEMAR HAUPT,
 HENRY HASPER.